United States Patent
Hsueh (10) Patent No.: US 9,030,756 B2
(45) Date of Patent: May 12, 2015

(54) DRIVING APPARATUS OF ZOOM LENS

(75) Inventor: Chun-Yu Hsueh, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 47 days.

(21) Appl. No.: 13/242,205

(22) Filed: Sep. 23, 2011

(65) Prior Publication Data

US 2013/0077180 A1     Mar. 28, 2013

(51) Int. Cl.
    *G02B 15/14*     (2006.01)
    *G02B 7/02*     (2006.01)
    *G02B 7/10*     (2006.01)

(52) U.S. Cl.
    CPC .................................... *G02B 7/102* (2013.01)

(58) Field of Classification Search
    USPC .................. 359/811, 819, 815, 822–824, 704
    See application file for complete search history.

(56) References Cited

U.S. PATENT DOCUMENTS 3,997,245 A * 12/1976 Uesugi ........................... 359/705
5,317,351 A * 5/1994 Takahara et al. ................. 396/81
6,011,659 A * 1/2000 Onda ............................. 359/704

* cited by examiner

*Primary Examiner* — Scott J Sugarman
*Assistant Examiner* — Brandi Thomas
(74) *Attorney, Agent, or Firm* — Tracy M. Heims; Apex Juris, pllc (57) ABSTRACT

A driving apparatus of a zoom lens includes a rotary barrel, a fixed barrel, a guiding rail, and a lens frame. The rotary barrel has at least a protrusion on an outer side thereof. The fixed barrel receives the rotary barrel therein, and has at least a guiding slot and a recess on an inner side thereof. The protrusion of the rotary barrel engages the guiding slot of the fixed barrel, and the guiding slot is communicated with the recess. The guiding rail is provided in the recess of the fixed barrel. The lens frame is received in the fixed barrel, and engages the guiding rail to be driven to move along the guiding rail. Therefore, all the elements of the driving apparatus are received in the fixed barrel that it may reduce the size of the driving apparatus.

6 Claims, 8 Drawing Sheets

DRIVING APPARATUS OF ZOOM LENS

BACKGROUND OF THE INVENTION

1. Field of the Invention

The present invention relates generally to a lens, and more particularly to a driving apparatus of a zoom lens.

2. Description of the Related Art

Figure 1:
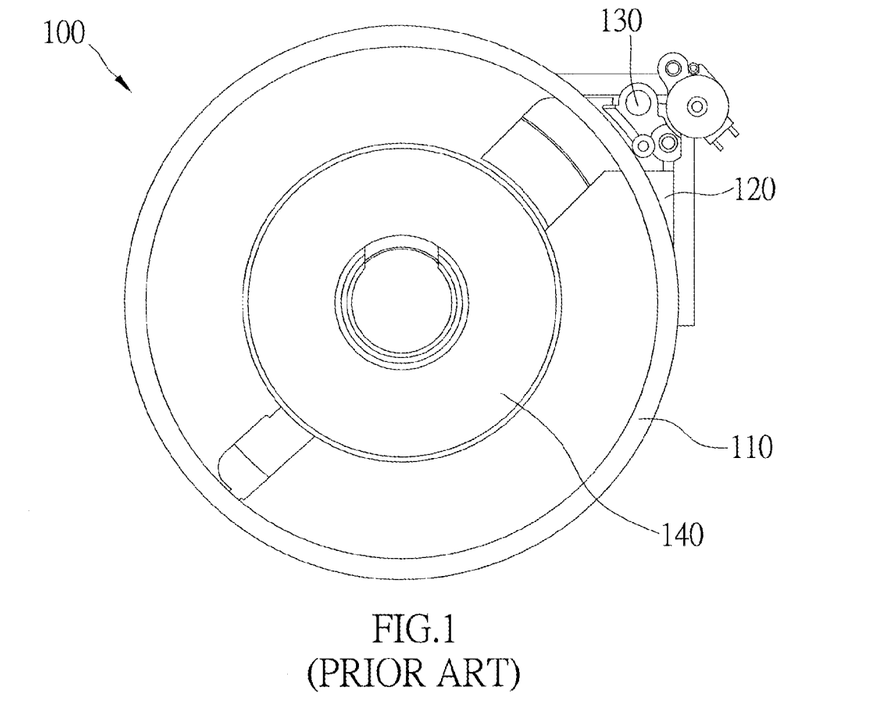
FIG. 1 is a front view of the conventional driving apparatus and the fixed barrel of the zoom lens.
Figure 2:
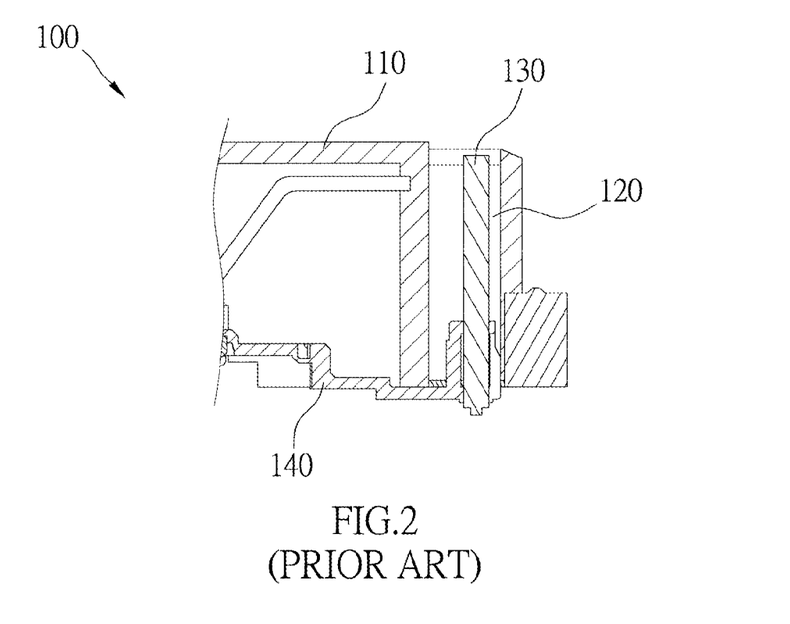
FIG. 2 is a sectional view of the conventional driving apparatus.

As the improvement of image technology, image devices, such as camera, video camera, microscope, and scanner, are made small and light as possible that the zoom lens mounted in such image devices has to be smaller. FIG. 1 and FIG. 2 show a conventional driving apparatus 100 of a zoom lens and a fixed barrel 110 thereof. It provides a room 120 beside the fixed barrel 110, in which a guiding rail 130 is received. The guiding rail 130 engages a lens frame 140 that the lens frame 140 is driven to move along the guiding rail 130 for focusing.

However, the room 120 is outside the fixed barrel 110 that it needs extra space for the room 120 and the guiding rail 130. As a result, the size of the image device is limited by the driving apparatus 100. Therefore, the conventional driving apparatus 100 of the zoom lens still has some places that need to be improved.

SUMMARY OF THE INVENTION

The primary objective of the present invention is to provide a driving apparatus of a zoom lens, which has a small size.

According to the objective of the present invention, a driving apparatus of a zoom lens includes a rotary barrel, a fixed barrel, a guiding rail, and a lens frame. The rotary barrel has at least a protrusion on an outer side thereof. The fixed barrel receives the rotary barrel therein, and has at least a guiding slot and a recess on an inner side thereof. The protrusion of the rotary barrel engages the guiding slot of the fixed barrel, and the guiding slot is communicated with the recess. The guiding rail is provided in the recess of the fixed barrel. The lens frame is received in the fixed barrel, and engages the guiding rail to be driven to move along the guiding rail.

Therefore, all the elements of the driving apparatus are received in the fixed barrel that it may reduce the size of the driving apparatus.

DETAILED DESCRIPTION OF THE INVENTION

Figure 3:
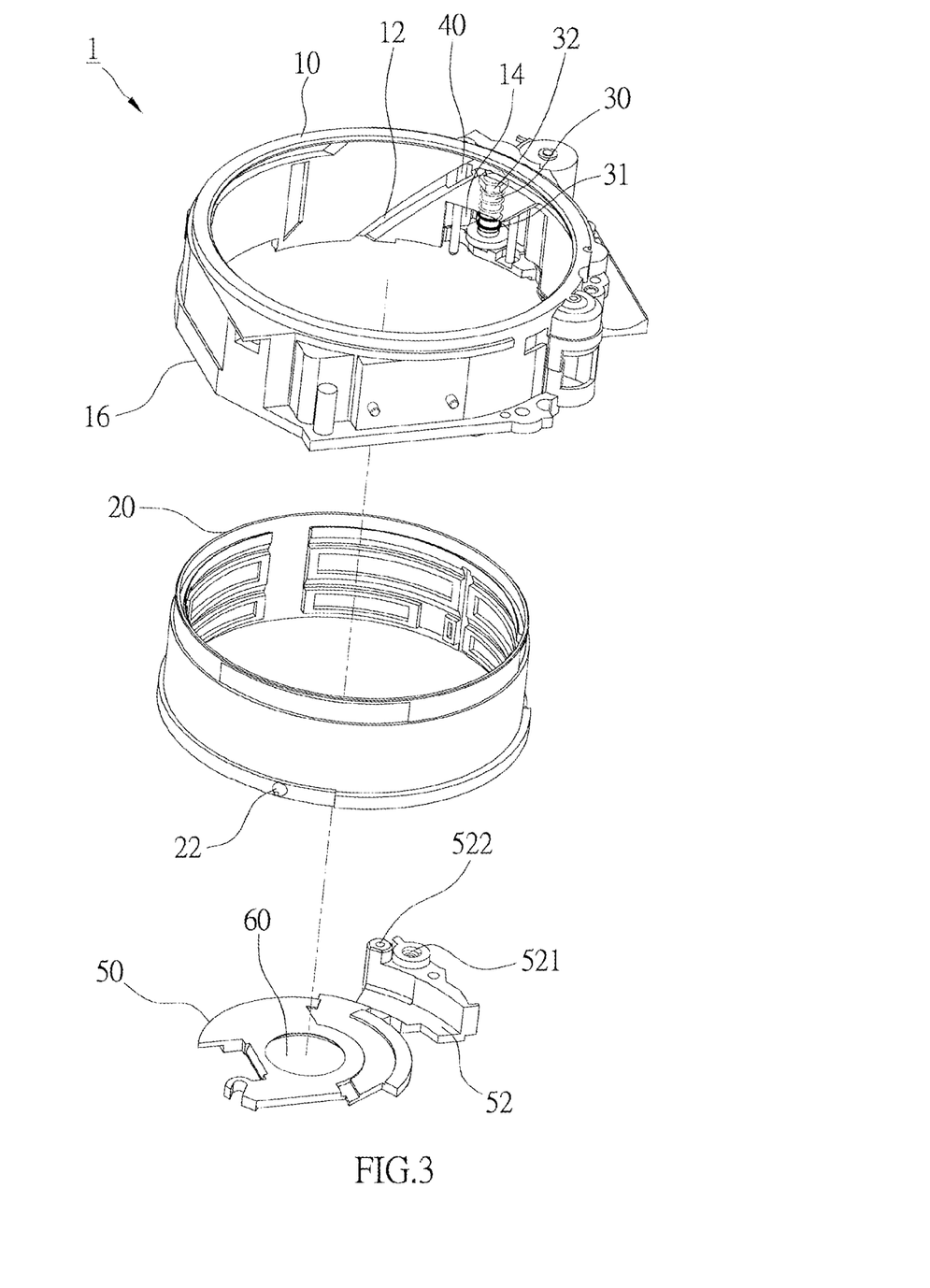
FIG. 3 is an exploded view of a preferred embodiment of the present invention.
Figure 4:
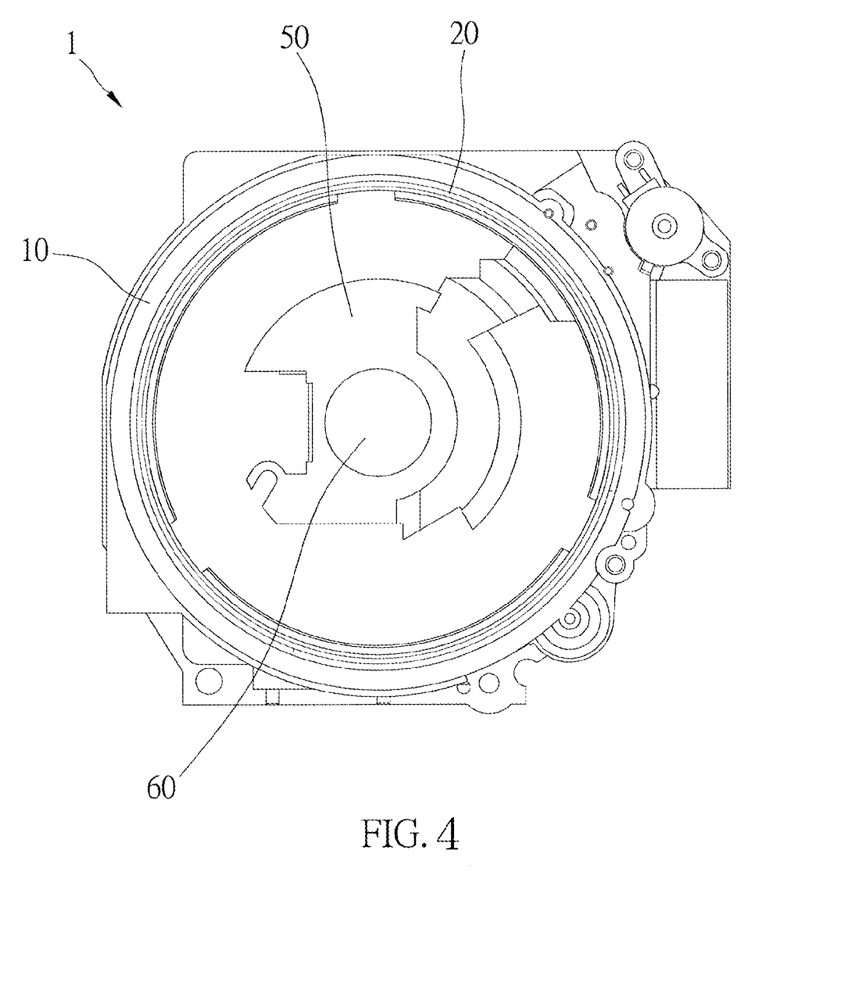
FIG. 4 is a top view of the preferred embodiment of the present invention.

FIG. 3 and FIG. 4 show a driving apparatus 1 of a zoom lens, which is mounted in an image device (not shown), of the preferred embodiment of the present invention. The driving apparatus 1 includes a fixed barrel 10, a rotary barrel 20, a screw bar 30, a guiding rail 40, and a lens frame 50.

Figure 5:
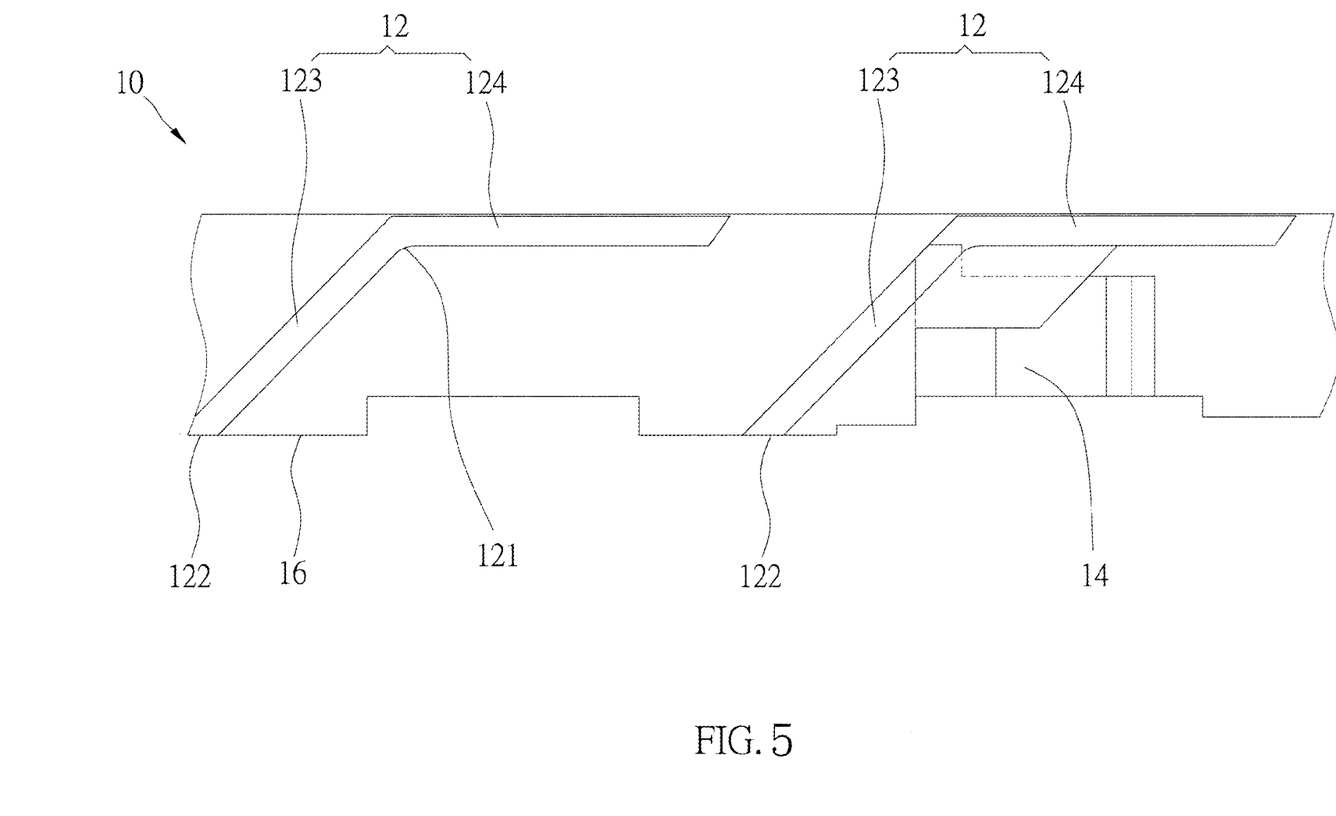
FIG. 5 shows the inner side of the fixed barrel of the preferred embodiment of the present invention.
Figure 6:
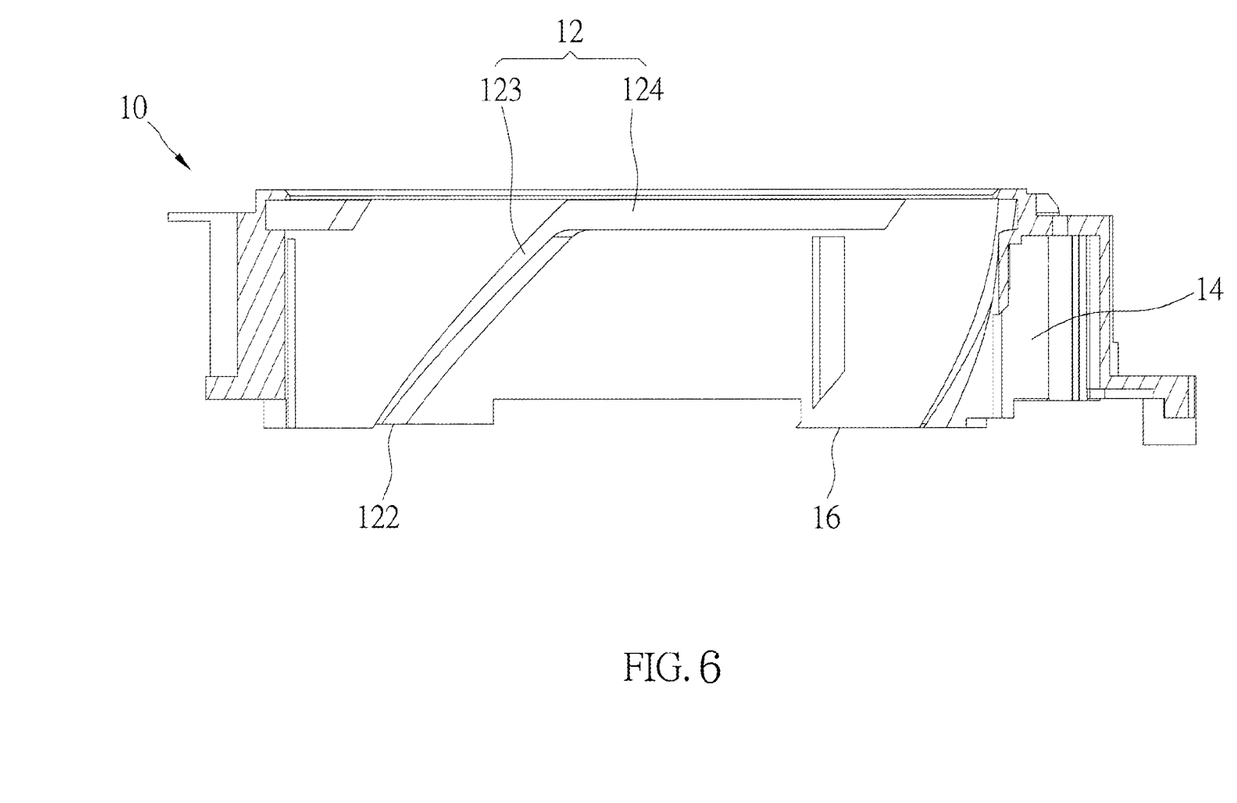
FIG. 6 is a sectional view of the fixed barrel of the preferred embodiment of the present invention.

As shown in FIG. 5, the fixed barrel 10 is provided with three guiding slots 12 and a recess 14 on an inner side thereof. Each guiding slot 12 has a bend point 121 at meddle and a start 122 at a bottom end 16 thereof. The guiding rail 12 has a starting section 123 and a zooming section 124 at opposite sides of the bend point 121. The opposite ends of the starting section 123 are the start 122 and the bend point 121. The starting section 123 slopes up from the start 122 to the bend point 121, and the zooming section 124 is horizontal and is the end section of the guiding rail 12. As shown in FIG. 6, the recess 14 is communicated with the starting section 123 of one of the guiding slots 12.

The rotary barrel 20 is received in the fixed barrel 10. The rotary barrel 20 has three protrusions 22 to engage the guiding slots 12 respectively. The protrusions 22 enter the guiding slots 12 via the starts 122.

The screw bar 30 is parallel to the guiding rail 40, and both of the screw bar 30 and the guiding rail 40 are mounted in the recess 14 of the fixed barrel 10. A spring 31 is fitted to the screw bar 30.

Figure 7:
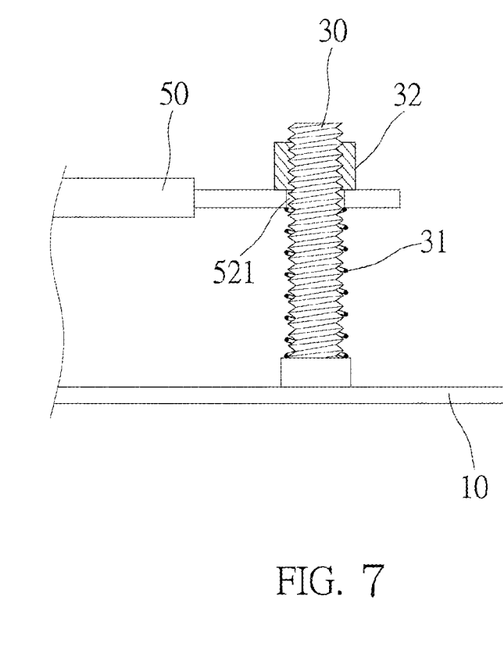
FIG. 7 is a sectional view of the preferred embodiment of the present invention, showing the screw bar.

The lens frame 50 is received in the fixed barrel 10. A plurality of lenses 60 are mounted on the lens frame 50. The lens frame 50 has a through hole 521 and a guiding hole 522 on an end 52 thereof. As shown in FIG. 7, a nut 32 is mounted in the through hole 521 that the screw bar 30 engages the nut 32, and the spring 31 on the screw bar 30 urges the fixed barrel 10 and the lens frame 50 respectively. The guiding rail 40 passes through the guiding hole 522. The screw bar 30 is turned by a motor (not shown) that the screw bar 30 may drive the lens frame 50 to move along the guiding rail 40 through the spring 31 and the nut 32.

Typically, in order to reduce the size of the image device, the zoom lens will move into the fixed barrel 10 before the power is turned off, and move out of the image device while the power is turned on to focus the image on the image sensor.

Figure 8:
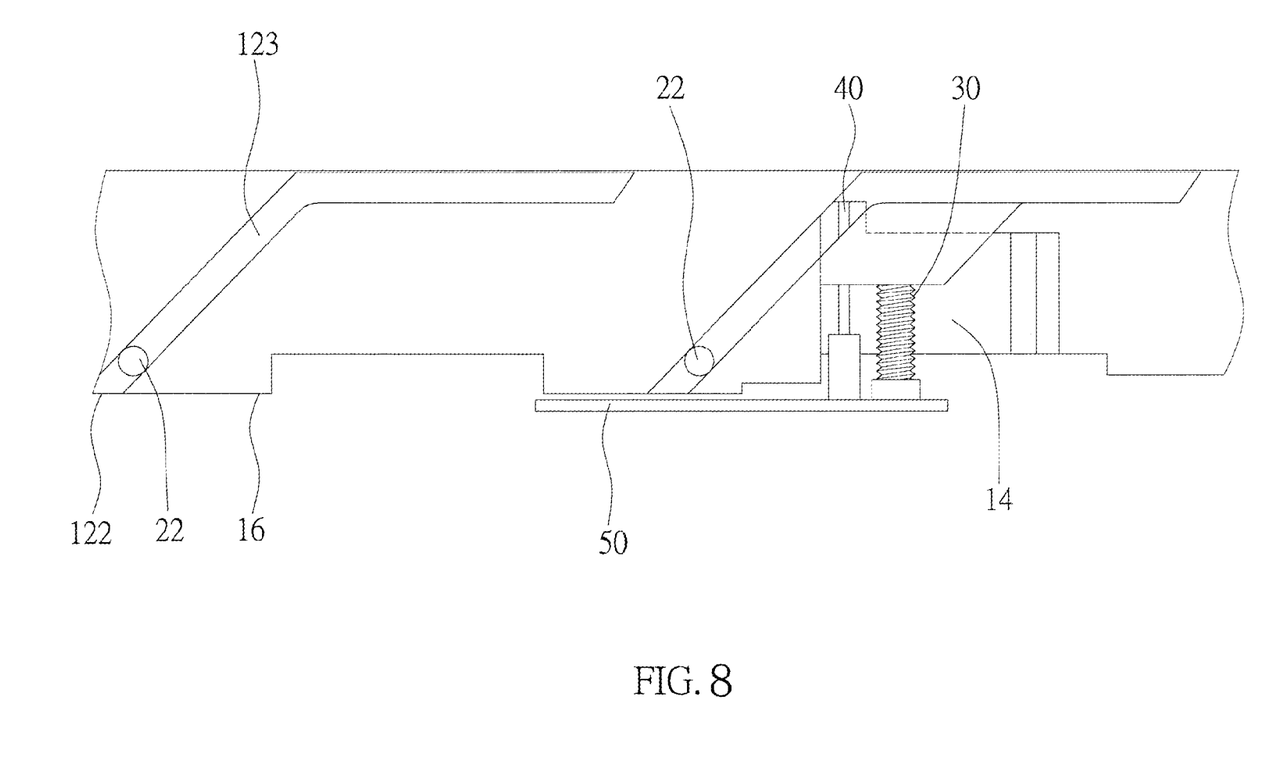
FIG. 8 is a sketch diagram of the preferred embodiment of the present invention, showing the idle condition.

FIG. 8 shows the power is off, and the driving apparatus 1 is turned to an idle condition, in which the rotary barrel 20 moves to an idle position where the protrusions 22 are in the starting sections 123 and close to the start 122, and the lens frame 50 moves to an idle position. In the idle condition, both of the rotary barrel 20 and the lens frame 50 are received in the fixed barrel 10, and the lens frame 50 is closer to a bottom end 16 of the fixed barrel 10 than the rotary barrel 20.

Figure 9:
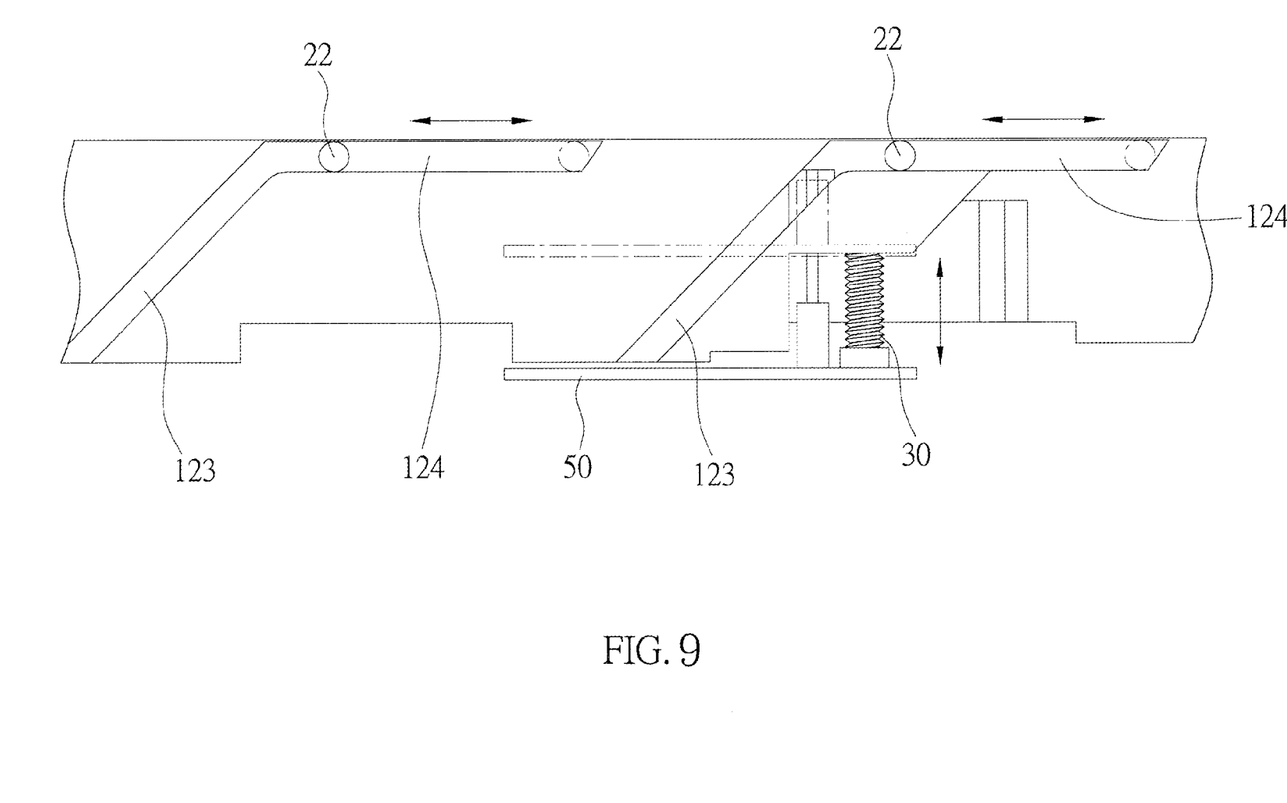
FIG. 9 is a sketch diagram of the preferred embodiment of the present invention, showing the working condition

While the power is turned on, a motor (not shown) turns the rotary barrel 20 that the protrusions 22 move in the starting sections 123 to move a lens barrel (not shown) out of the image device, and when the protrusions 22 arrive zooming sections 124, the driving apparatus 1 of the present invention is turned to a working condition, as shown in FIG. 9. In the working condition, the protrusions 22 are free to move in the zooming sections 124 when the rotary barrel 20 is turned for zooming, and the lens frame 50 may be driven to move along the guiding rail 40 for focusing.

To avoid the rotary barrel 20 and the lens frame 50 from jam, the driving apparatus 1 of the present invention is set that the lens frame 50 may be moved only after the driving apparatus 1 is turned to the working condition. In other words, when the power is turned on, the protrusions 22 move from the starting sections 123 to the zooming sections 124 first, and the lens frame 50 is allowed to move along the guiding rail 40 only after the protrusions 22 have arrived the zooming sections 124. On the contrary, while the power is turned off, the lens frame 50 will return to its idle position first, and then the protrusions 22 move to the starting sections 123 from the zooming sections 124 to move the rotary barrel 20 back to its idle position, and now the driving apparatus 1 of the present invention is turned to the idle condition. As a result, the rotary barrel 20 and the lens frame 50 will not jam when turn on or turn off the power.

As shown in FIGS from FIG. 4 to FIG. 6, the recess 14 is communicated with the guiding slot 12, and the recess 14 is provided on the inner side of the fixed barrel 10 that there is no element outside the fixed barrel 10, and therefore, the size of the driving apparatus 1 of the present invention may be reduced.

It is noted that the locations of the guiding slots 12 and the recess 14 on the inner side of the fixed barrel 10 may be changed according to designer and requirements. Any design which has the structure of the recess 14 communicated with the guiding slot 12 and the recess 14, in which the guiding rail 40 is received, on the inner side of the fixed barrel 10 is still within the scope of the present invention.

The description above is a few preferred embodiments of the present invention. These equivalences of the present invention are still in the scope of claim construction of the present invention.

What is claimed is:

1. A driving apparatus of a zoom lens, comprising:
   a rotary barrel having at least a protrusion on an outer side thereof;
   a fixed barrel, in which the rotary barrel is received, having at least a guiding slot and a recess on an inner side thereof, wherein the protrusion of the rotary barrel engages the guiding slot of the fixed barrel, and the recess is communicated with the guiding slot, wherein the guiding slot has a bend point to form a starting section and a zooming section at opposite sides of the bend point, and a start at an opposite end of the starting section that the rotary barrel stops at an idle position where the protrusion is in the starting section and close to the start when the driving apparatus is turned to an idle condition, and the protrusion of the rotary barrel moves to the zooming section to be driven to move along the zooming section when the driving apparatus is turned to a working condition, and wherein a part of the starting section and a part of the zooming section share are in the recess;
   a guiding rail mounted in the recess of the fixed barrel where said guiding rail has opposite ends that are affixed to opposite sidewalls of said recess of said fixed barrel; and
   a lens frame received in the fixed barrel, where said lens frame has a guiding hole to engage said guiding rail so that lens frame can be driven to move along the guiding rail.

2. The driving apparatus as defined in claim 1, wherein the guiding slot has an obtusely angled point in a mid-section to form a starting section and a zooming section at opposite sides of the obtusely angled point, and a start at an opposite end of the starting section that the rotary barrel stops at an idle position where the protrusion is in the starting section and close to the start when the driving apparatus is turned to an idle condition, and the protrusion of the rotary barrel moves to the zooming section to be driven to move along the zooming section when the driving apparatus is turned to a working condition.

3. The driving apparatus as defined in claim 1 wherein the lens frame stops at an idle position when the driving apparatus is turned to the idle condition, and in the idle condition the lens frame is closer to a bottom end of the fixed barrel than the rotary barrel, and the lens frame is free to move along the guiding rail when driving apparatus is turned to the working condition.

4. The driving apparatus as defined in claim 3, wherein the protrusion of the rotary barrel moves to the zooming section from the starting section, and then the lens frame is allowed to move along the guiding rail when the driving apparatus is turned from the idle condition to the working condition.

5. The driving apparatus as defined in claim 3, wherein the rotary barrel moves to the idle position after the lens frame moves to the idle position when the driving apparatus is turned from the working condition to the idle condition.

6. The driving apparatus as defined in claim 1, wherein the recess is communicated with the starting section of the guiding slot.

\* \* \* \* \*